United States Patent [19]

Feldman et al.

[11] 4,397,471

[45] Aug. 9, 1983

[54] ROTARY PRESSURE SEAL STRUCTURE AND METHOD FOR REDUCING THERMAL STRESSES THEREIN

[75] Inventors: Paul S. Feldman, Morrow; Joseph C. Burge; Michael A. Radomski, both of Cincinnati, all of Ohio; Robert P. Tameo, Peabody, Mass.

[73] Assignee: General Electric Company, Cincinnati, Ohio

[21] Appl. No.: 298,716

[22] Filed: Sep. 2, 1981

[51] Int. Cl.³ .......................... F10D 5/18; F02C 7/12
[52] U.S. Cl. .................................... 277/27; 415/115; 415/116
[58] Field of Search .................. 415/116, 180; 277/1, 277/27

[56] References Cited

U.S. PATENT DOCUMENTS

| | | | |
|---|---|---|---|
| 3,347,553 | 10/1967 | Schweiger | 277/27 |
| 3,632,221 | 1/1972 | Uehling | 415/115 |
| 3,635,586 | 1/1972 | Kent et al. | 415/116 |
| 3,647,313 | 3/1972 | Koff | 415/115 |
| 3,768,921 | 10/1973 | Brown et al. | 415/116 |
| 3,989,410 | 11/1976 | Ferrari | 415/115 |
| 4,067,583 | 1/1978 | Germain | 277/27 |

*Primary Examiner*—Robert I. Smith
*Attorney, Agent, or Firm*—Derek P. Lawrence

[57] ABSTRACT

A rotary member for restricting the flow of high temperature gas from a first cavity, intermediate rotating and stationary members of a gas turbine engine, and a second cavity, includes a central disc bore segment having an inner circumference and an outer circumferential seal segment. A closed cavity is formed by a portion of the rotating member and a portion of the rotating seal disc, with the inner circumference of the central disc bore segment positioned in a predetermined spaced relation with respect to the rotating member, forming a gap therebetween. The closed cavity contains at least one aperture adjacent the outer circumferential seal segment. A portion of the high temperature gas flows through the aperture into the closed cavity, then exits the closed cavity through the gap formed between the inner circumference of the central disc bore segment and the rotating member. The gap in effect presents a constriction which causes a concomitant increase in the velocity of the gas through the gap. The high temperature gas, flowing at a relatively high velocity across the inner circumference of the central disc bore segment reduces the temperature differential between the inner circumference and the outer circumferential seal segment thereby reducing thermal stresses in the rotary seal.

8 Claims, 2 Drawing Figures

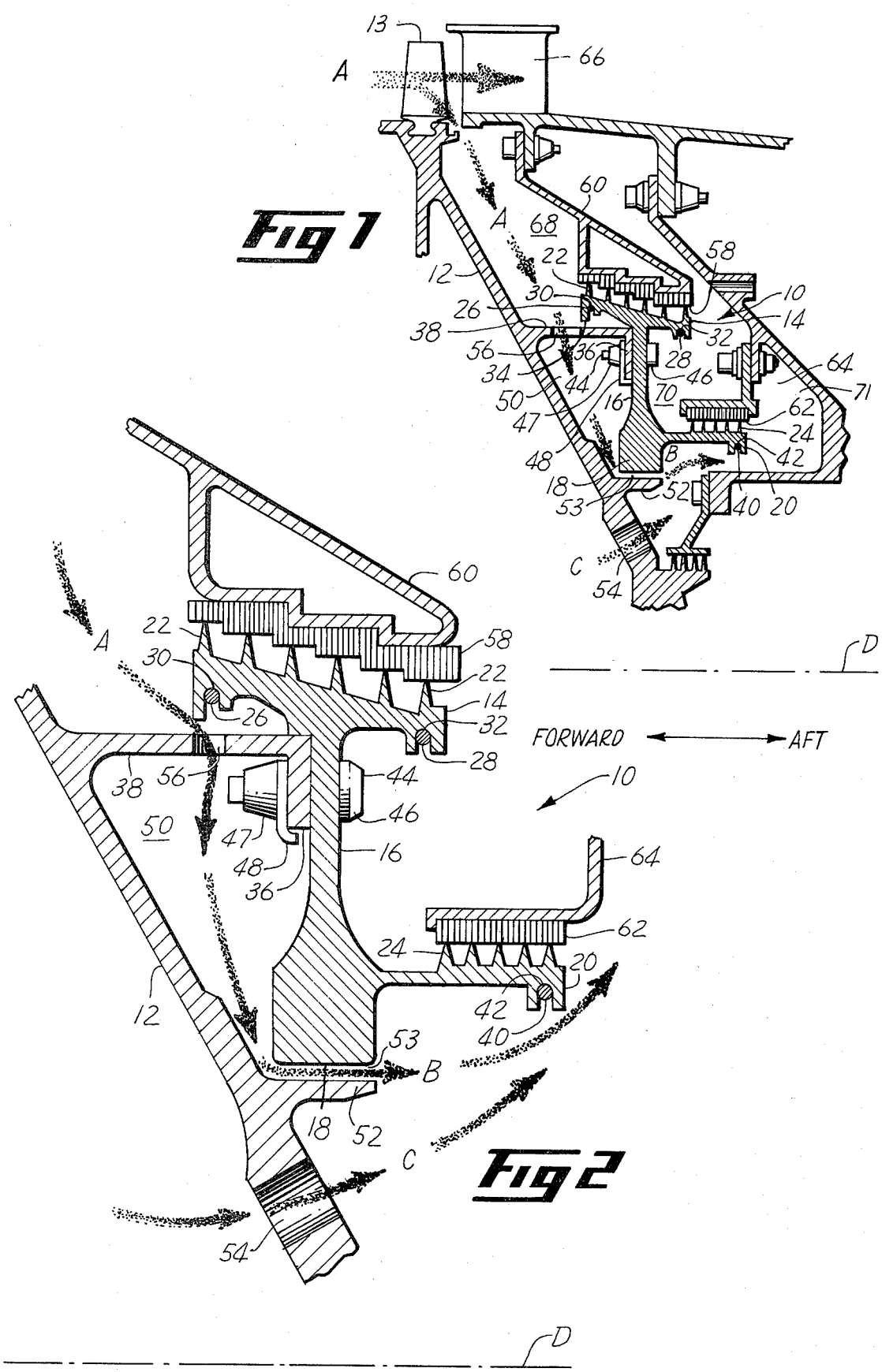

ROTARY PRESSURE SEAL STRUCTURE AND METHOD FOR REDUCING THERMAL STRESSES THEREIN

BACKGROUND OF THE INVENTION

1. Field of the Invention

This invention relates generally to improvements in gas turbine engines and, more particularly, to rotating seals used in such engines.

2. Description of the Prior Art

Rotary seals of the labyrinth-type, comprising one or more circumferential teeth, one part which are contiguous with a circumferential sealing surface on another part, the two parts or elements being relatively rotatable, are commonly used in gas turbine engines to assist in direction of engine service air flows. Seals of this type are used to restrict air flow within cavities formed between stationary and rotating members of the engine without impeding the rotational movement of the rotating member. In addition, rotating seals have been used to assist in balancing the main engine bearing axial thrust loads.

A disadvantage of seals of this type is that they are formed of relatively complex hardware components which are expensive to machine and difficult to assemble. In addition, some of the parts of the seal assembly protrude into adjoining stationary cavities. The rapid revolution of the rotating seal with respect to the air within the stationary cavity causes that air to heat due to the windage friction engendered by the protruding parts. Further, due to their relatively complex structure, prior art rotating seals have a relatively large minimum radial dimension or length which is subject to thermal stresses due to the radial thermal gradient present in gas turbine engines. This relatively large minimum radial dimension further limits the flexibility for using a rotating seal to assist in balancing the main engine bearing axial thrust loads since the designer is limited to a certain minimum area of the rotating seal disc.

Accordingly, one object of the present invention is to provide a rotating seal having a minimal number of components which are relatively inexpensive to machine and easy to assemble.

Another object of the present invention is to provide a rotating seal which causes minimum temperature rise in the surrounding air due to windage friction.

A further object of the present invention is to provide a rotating seal having an active air circuit which reduces thermal stresses due to thermal gradients.

Yet another object of the present invention is to provide a rotating seal having an active air circuit which reduces the thermal time constant of the seal disc bore which in turn reduces the thermal gradient between the disc bore and the seal rim during gas turbine engine transient operation.

SUMMARY OF THE INVENTION

A rotary seal for use in a gas turbine engine includes a central disc bore segment having an inner circumference, and an outer seal segment for restricting the flow of gas impinging thereon. An active gas circuit, for reducing thermal stresses between the central disc bore segment and the outer seal segment, comprises means for diverting at least a portion of the impinging gas through at least a portion of the central disc bore segment across the inner circumference thereof.

DESCRIPTION OF THE DRAWING

While the specifications concludes with claims distinctly claiming and particularly pointing out the invention described herein, it is believed that the invention will be more readily understood by reference to the discussion below and the accompanying drawing in which:

FIG. 1 depicts a partial cross-sectional view of a portion of a gas turbine engine, aft of the high pressure compressor.

FIG. 2 is an portion of FIG. 1.

DETAILED DESCRIPTION

Referring to FIGS. 1 and 2, there is shown a partial cross section of a rotating seal of the present invention, generally designated 10. In the preferred embodiment, the rotating seal 10 is attached to a conical aft stub shaft 12 of a high pressure compressor of a gas turbine engine. The last stage blade 13 of the high pressure compressor is shown in FIG. 1. The rotating seal 10 includes a compressor discharge seal portion 14 disposed about the outer circumference or rim of a disc-shaped member 16 having a central disc bore portion 18. A vent seal portion 20 extends from the disc member 16. The compressor discharge seal portion 14 is a labyrinth-type, well known in the art of rotating seals, having, in the preferred embodiment, six teeth 22, disposed on the outer circumference of the compressor discharge seal portion 14. The vent seal portion 20, is also of the labyrinth-type having five teeth 24 in the preferred embodiment, disposed on the outer circumference thereof.

First and second 360 degree split wire damper rings, 26 and 28, are inserted in first and second recesses, 30 and 32 respectively, in the inner cylindrical surface of the compressor discharge seal portion 14 adjacent the edges of said inner surface. These recesses are of sufficient depth to insure adequate retention of the split damper rings. A flange portion 34 extends from the inner surface of the compressor discharge portion 14 at the forward edge of the first recess 30. A third 360 degree split wire damper ring 40 is installed in a recess 42 in the inner surface of the vent seal 20 opposite the teeth 24, the recess being of sufficient depth to afford adequate retention of the damper ring.

The rotating seal 10 is mounted to a flange portion 36 of a cylindrical arm 38 extending from the aft stub shaft 12 by means of bolts 44. When thus mounted, the radial gap between the flange portion 34 and the cylindrical arm 38 is less than the diameter of the first damper ring 26, thereby affording additional means for retaining the first damper ring 26.

Each bolt 44 has a low profile head 46 on the end thereof which is disposed adjacent that surface of the disc member 16 from which the vent seal portion 20 extends. The bolt 44 threadingly engages a self-locking shank nut 47 having an anti-rotational hook 48, the hook end of which abuts the inside diameter of the flange 36. In the preferred embodiment, the rotating seal 10 is fastened to the flange 36 using fifty-four low head profile bolts 44 and self-locking shank nuts 47 with anti-rotational hooks 48. When assembled, the rotating seal 10, in conjunction with the cylindrical arm 38 and the aft stub shaft 12 forms a substantially closed rotor cavity 50. An axial shelf 52 extends from the aft stub shaft 12. In the assembled configuration, the inner circumference of the disc bore portion 18 of the rotating seal 10 is positioned adjacent to, and spaced a predetermined radial distance from, the axial shelf 52, thereby forming a radial gap 53. In the preferred embodiment, the cold radial gap 53 is 0.005 inch.

The aft stub shaft 12 contains a plurality of apertures 54 positioned beneath the axial shelf 52. In the preferred embodiment, there are twenty apertures disposed around the conical aft stub shaft 12, only one of which is shown in FIG. 1. In addition, there are a plurality of apertures 56 in the cylindrical arm 38 of the conical aft stub shaft 12. In the preferred embodiment, there are four apertures 56 disposed around the cylindrical arm 38, only one of which is shown in FIG. 1. The six teeth 22 of the labyrinth type compressor discharge seal portion 14 sealingly engage a first circumferential stepped sealing surface 58 attached to a first stationary structural member 60. The five teeth 24 of the labyrinth type vent seal portion 20 sealingly engage a second circumferential sealing surface 62, attached to a second stationary structural member 64.

The rotating seal assembly operates as follows. Air from the high pressure compressor discharge portion of the gas turbine engine indicated by arrows "A", flows past an outlet guide vane 66 to a combustor (not shown). This high pressure air has a temperature as high as 1100 degrees Fahrenheit and a portion of the high pressure, high temperature air A flows into a first cavity 68 (see FIG. 1). The teeth 22 of the compressor discharge seal portion 14 of the rotating seal 10, in sealing combination with the stepped sealing surface 58 restricts the flow of high pressure air A from entering a second cavity 70 (see FIG. 1), thereby creating an area of high pressure on the forward side (left side in FIGS. 1 and 2) of the rotating seal 10 as compared to the pressure existing on the aft side (right side in FIGS. 1 and 2) of the rotating seal 10. In addition, high pressure, high temperature air A enters the substantially closed rotor cavity 50 through the radial apertures 56 in the cylindrical arm 38. From there the air enters a third cavity 71 through the radial gap 53. In passing through the gap 53, the air is accelerated to high velocity producing a high heat transfer coefficient between the air and the disc bore 18. This in turn reduces the thermal time constant of the disc bore 18 and reduces the thermal gradient between the disc bore 18 and seal rim 22, which has a very rapid thermal response during transient operation. The reduced thermal gradient results in reduced thermal stresses. It should be noted that the temperature of the air from the compressor discharge portion varies in accordance with the thrust development of the gas turbine engine. However since, the disc activation air B flowing through the radial gap 53 consists of a portion of air A from the compressor discharge portion, both having comparable temperatures, the thermal gradient across the rotating seal 10 will always be diminished regardless of the temperature of the air from the compressor discharge portion.

Cooling air on the order of 500 degrees Fahrenheit or less, flows through the compressor bore (not shown) which is formed in part by the conical aft stub shaft 12. This cooling air flows from forward to aft through the apertures 54 of the conical aft stub shaft 12 as indicated by arrows "C". The compressor bore cooling air C mixes with the disc bore activation air B on the aft (right) side of the conical aft stub shaft 12 as shown in FIGS. 1 and 2. Thereafter, this mixture of air is dumped overboard. Since the temperature differential between the compressor bore cooling air and the disc activation air is relatively great, the axial shelf 52 also serves to deflect the compressor bore cooling air C away from the disc bore portion 18 of the rotating seal 10 thereby minimizing the cooling effect this air has on the disc bore portion 18. This feature of the seal assembly of the present invention additionally insures that the temperature of the disc bore portion 18 remains comparable to that of the compressor discharge seal portion 14 thereby minimizing the temperature gradient along the radial dimension of the rotating seal 10.

In operation, the rotating seal 10 revolves about its axis, represented by center line D in FIGS. 1 and 2, at very high speeds. Since the second cavity 70 is formed in part by the rotating seal 10 and in part by stationary structure, including the first and second stationary structural members 60 and 64, the air within the second cavity 70 moves relatively slowly with respect to the speed of the rotating seal 10. Consequently, the high speed rotation of the rotating seal 10 induces friction or windage heating of the air in the second cavity 70. This friction heating is greatly reduced by the use of the low head profile bolts 44 in the rotating seal 10 of the present invention which minimize windage heating at the flange. Since all of the structure forming the closed rotor cavity 50 rotates together, there is a minimal velocity difference between the air in the closed rotor cavity 50 and the surrounding structure. Consequently, the self-locking shank nuts 46 and the anti-rotational hook 48, even though they extend well into the cavity 50, will cause only minimal windage heating, if any. This design feature of the rotating seal of the present invention, also permits the use of bolts of different lengths in order to assist in rotor balance.

In addition to reducing windage heating, the use of low profile head bolts in accordance with the present invention eliminates the necessity of providing an anti-windage flange over the bolt heads thereby facilitating accessibility for normal assembly and disassembly as well as accessibility to grind off bolt heads in the event of lock nut seizure.

As previously stated, rotating seals are also sometimes used to balance axial thrust loads in gas turbine engines. The fixed axial spacial relationship between the rotating structure and the stationary structure is maintained by the thrust bearings (not shown). In a gas turbine engine, the compressor tends to exert a force in the forward direction relative to the stationary structure while the turbine tends to exert a force in aft direction relative to the stationary structure. In order to minimize the loads on the thrust bearings, it is desirable to balance the actual forces exerted by the compressor and turbine. One way of accomplishing this is to design the rotating seal such that the high pressure air from the high pressure compressor outlet which bleeds into the second cavity 70, located aft of the rotating seal 10, exerts a force on the seal 10 in the forward direction, with respect to the stationary structure, which would balance the force being exerted in the aft direction by the turbine (not shown). Since force equals pressure times area, and the pressure in the second cavity 70 is a function of the thrust of the gas turbine engine, and the force differential between the compressor and the turbine is also a function of the thrust of the engine, it is possible to design a rotating seal having a known disc surface area which would balance the axial forces under most conditions of thrust. Using the simple structure of the rotating seal of the present invention, the designer has relatively wide flexibility in providing a rotating seal disc surface area which, when acted upon by the high pressure air in the aft cavity, will balance axial loads under most thrust conditions.

It can be seen by the above description that the rotating seal of the present invention, although requiring a minimal number of components which are relatively inexpensive to machine, affords a seal which is less subject to thermal stresses, causes less windage heating of the surrounding air and which affords more flexibility in axial thrust load balance compensation than prior art rotating seals.

While certain embodiments of Applicant's invention have been described in detail, it should be apparent from reading the above description that changes could be made in Applicant's basic device without departing from the broader scope of Applicant's invention as claimed in the following claims.

We claim:

1. A rotating seal assembly comprising:
   (a) a rotating segment comprising:
      (i) a substantially conical shaped member having an outer surface;
      (ii) a substantially cylindrical arm extending from said outer surface, said arm having a flange at the distal end thereof; and
      (iii) a substantially cylindrical shelf extending from said outer surface;
   (b) a substantially disc shaped segment having a seal portion disposed around the outer circumference and a bore in the central portion thereof;
   (c) means for attaching said disc shaped segment to said flange with the circumference of said bore positioned in predetermined spaced relation with respect to said shelf forming a gap therebetween; and
   (d) a substantially closed cavity formed by at least a portion of said rotating segment and a portion of said disc segment.

2. The rotating seal assembly of claim 1 wherein said attaching means comprises at least one bolt having a low profile head and a nut threadedly attached to the end of said bolt opposite said low profile head, said nut and bolt end extending into said closed cavity.

3. The rotating seal assembly of claim 1 additionally comprising a means for providing rotational balancing.

4. The rotating seal assembly of claim 3 wherein said rotational balancing means comprises at least two low profile head fastening bolts of different lengths.

5. The rotating seal assembly of claim 1 additionally comprising means for reducing temperature differential between the seal portion and bore circumference of said disc segment.

6. The rotating seal assembly of claim 5 wherein said temperature differential reducing means comprises a fluid passage into said closed cavity through said rotating segment.

7. The rotating seal assembly of claim 6 wherein said closed cavity is formed by a portion of said conical shaped member, said cylindrical arm and said disc member.

8. The rotating seal assembly of claim 7 wherein said fluid passage comprises at least one aperture disposed in said cylindrical arm.

* * * * *